United States

[11] 3,624,817

[72] Inventors Tzuo-Chang Lee
Minneapolis;
James David Zook, Burnesville, both of Minn.
[21] Appl. No. 841,057
[22] Filed July 11, 1969
[45] Patented Nov. 30, 1971
[73] Assignee Honeywell Inc.
Minneapolis, Minn.

[54] LIGHT-DEFLECTION SYSTEM
11 Claims, 3 Drawing Figs.
[52] U.S. Cl. .................................................. 350/150,
350/DIG. 2, 350/167
[51] Int. Cl. ...................................................... G02f 3/00
[50] Field of Search ........................................ 350/150,
160, 167, DIG. 2

[56] References Cited
UNITED STATES PATENTS
2,981,140  4/1961  Ogle .............................. 350/167

| 3,084,453 | 4/1963 | Brown | 350/167 X |
| 3,151,520 | 10/1964 | Nadeau | 350/167 X |
| 3,448,282 | 6/1969 | Fleisher et al. | 350/150 X |
| 3,485,553 | 12/1969 | Lee | 350/150 X |
| 3,515,455 | 6/1970 | Kompfner | 350/150 |

*Primary Examiner*—John K. Corbin
*Assistant Examiner*—Paul R. Miller
*Attorneys*—Lamont B. Koontz, Francis A. Sirr and Robert O. Vidas ABSTRACT: In a system for deflecting a light beam, a separate lens is positioned at each of the distinguishable beam positions (resolvable spots) produce by a first light beam deflector. The focusing action of the lenses separately reduces the size of each resolvable spot. The increases separation generated between any two adjacent resolvable spots of reduced size is advantageously utilized by incorporating a second light beam deflector into the deflection system. The second light beam deflector selectively deflects the light beam into the separations between the reduced resolvable spots, thereby obtaining the product of the number of resolvable spots obtainable from the first and second deflectors separately.

PATENTED NOV 30 1971  3,624,817

INVENTORS.
TZUO-CHANG LEE
JAMES D. ZOOK
BY Robert O. Vidas
ATTORNEY.

LIGHT-DEFLECTION SYSTEM

BACKGROUND OF THE INVENTION

The present invention relates to a system for deflecting a light beam and in particular to a system for increasing the obtainable number of distinguishable light beam positions (commonly referred to as resolvable spots) for a given deflector arrangement.

As used in this specification, the term "light" means electromagnetic waves within the frequency band including infrared, visible and ultraviolet light.

The light-beam-deflection art has greatly expanded as a result of the rising interest in the use of lasers for information storage purposes. A light beam deflector's performance in an information storage system is best measured in terms of the number of resolvable spots obtainable within the deflector's range of deflection. In the prior art, passive optical elements were utilized to increase the deflection angle. For example, E. I. Gordon and M. G. Cohen proposed the use of a telescope to increase the deflection angle of a light beam deflector in their article entitled "Electro-Optic Diffraction Grating for Light Beam Modulation and Diffraction" appearing in IEEE Journal of Quantum Electronics, Vol. OE-1 No. 5; Aug. 1965. However, an increase in the number of resolvable spots within the enlarged deflection angle was not obtained.

The most common approach taken by the prior art to increase the number of resolvable spots is to operate first and second light beam deflectors in tandem. In such a system, the optical elements are most frequently arranged so as to obtain a number of resolvable spots equal to the sum obtainable from each deflector separately. An alternative approach is commented upon in a letter entitled "Optimal Electrooptic Deflection Scheme" by J. G. Skinner appearing in Applied Optics, Vol. 7, No. 6 (June 1968). This letter suggests a deflection scheme for achieving the product of the number of resolvable spots obtainable separately from two deflectors. This result is obtained by placing a small prism in the path of each resolvable beam emerging from a first deflector so as to refract the beam to a new angular position with a large angular space between each resolvable beam position. A second deflector then deflects the beam into the voids produced by the prism assembly. This deflection scheme necessitates more complete optical apparatus than required by the present invention.

SUMMARY OF THE INVENTION

The light-beam-deflection system provided by the present invention utilizes a plurality of properly positioned, small lenses to increase the achievable number of resolvable spots. Briefly, in the present invention a light beam is deflected by a first light beam deflector to a plurality of first resolvable spots. Light directing means preferably in the form of small lenses are individually positioned at a plurality of the resolvable spots from the first deflector. Each lens separately focuses one of the first resolvable spots to second resolvable spots of reduced size thereby creating an increased separation or void between any two adjacent second resolvable spots. This increased separation is used advantageously by positioning a second light beam deflector so as to intercept the light beam emerging from the light-directing means and to deflect the light beam to at least one additional resolvable position between any two adjacent positions of the light beam emerging from the second spots.

In an optimum arrangement, the total number of resolvable spots obtained is equal to the product of the number of spots obtainable from each of the first and second deflectors separately. There are numerous advantages in achieving a greater number of resolvable spots using substantially the same quantity of E-O material as the prior art. For example, since the cost of the material predominates in any electro-optical (E-O) or magneto-optical-deflection system, this achievement substantially reduces the expense involved in such a deflection system.

A light-beam-deflection system for increasing the number of resolvable spots in two dimensions is also described.

DESCRIPTION OF THE PREFERRED EMBODIMENTS

Figure 1:
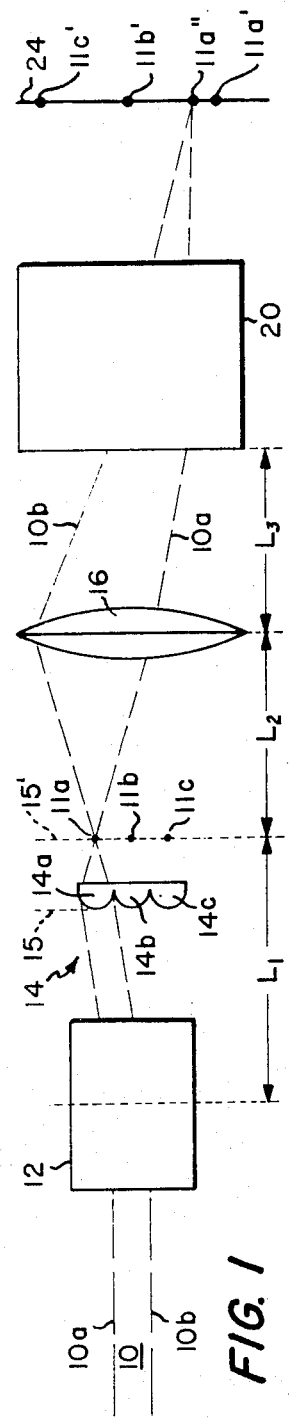
FIG. 1 is a diagrammatic illustration of an embodiment of the present invention illustrating the utilization of a fly's eye lens for increasing the number of obtainable resolvable spots.

FIG. 1 schematically illustrates a first light beam deflector 12, a light-directing means shown as a plurality of small lenses generally designated 14, light focusing means shown as lens 16, a second light beam deflector 20 and a display plane 24. First and second light beam deflectors 12 and 20 can be mechanical deflectors, such as rotatable mirrors, or they can be electro-optic (E-O) or magneto-optic (M-O) deflectors which deflect an incident light beam in response to an externally applied electric or magnetic field. As described with regard to FIG. 1, deflectors 12 and 20 are E-O deflectors of a type well-known in the art. For example, the deflectors may be of the general type discussed in a copending patent application, Ser. No. 717,322, now U.S. Pat. No. 3,506,335, which was filed Mar. 29, 1968 by James D. Zook and assigned to the same assignee as the present invention. Light beam deflector 20 may operate in either a digital or analog mode. For reasons which will become apparent, it is preferable that light beam deflector 12 operate in a digital mode. The light-directing means 14 is of a type generally referred to as a fly's eyelens and is comprised of a plurality of substantially identical simple lenses, shown as spherical lenses 14a, 14b and 14c, positioned in close proximity to one another. Fly's eyelens 14 can be molded from a low cost plastic. As shown, the lenses are positioned in a plane denoted by dotted line 15 and protrude from the left side of a flat plastic sheet which provides the needed mechanical support.

Light beam deflector 12 has a characteristic angular range ($\theta$) over which it deflects a light beam. Within this angular deflection range, a certain number of distinguishable beam positions ($N_R$) is obtainable. These distinguishable beam positions are commonly referred to as resolvable spots. The resolvable spots obtained from detector 12 in plane 15 are hereinafter referred to as first resolvable spots. The number of first resolvable spots, $N_{R1}$, is given by the equation; $N_{R1} = \theta/\theta_R$; where $\theta_R$ is the diffraction angle associated with the aperture of deflector 12. $\theta_R$ can be defined according to any criteria appropriate for the system under consideration such as the Rayleigh criterion or the Gaussian width of the deflected light beam. Equivalently, $N_{R1}$ can be defined as the ratio between the total deflection range of deflector 12 in plane 15 and the element resolvable spot size in plane 15. Light beam deflector 20 similarly has a characteristic angular deflection range and provides a certain number of resolvable spots, $N_{R2}$, within this angular range. As shown in FIG. 1, lenses 14a, 14b, and 14c are each positioned at one of the $N_{R1}$ resolvable spots obtained from deflector 12. Preferably, each lens has a diameter substantially the same as the diameter of the resolvable spot in plane 15. For purposes of illustration, the number of resolvable spots has been limited to three although a greater number of resolvable spots is normally obtainable from an E-O light beam deflector. It is not necessary that an individual lens be positioned at each of the $N_{R1}$ resolvable spots in plane 15 unless optimum performance is desired.

In operation, a light beam, generally designated 10, and having light rays 10a and 10b defining its outer extremity in the plane of deflection, is incident on light beam deflector 12. For purposes of this discussion, assume that the optical elements are immersed in an index of refraction matching material such that refraction of light beam 10 at the various interfaces in the deflection system may be ignored. E-O deflector 12 is adapted to intercept light beam 10 and selectively deflects the beam in response to the magnitude of an applied field. The means for applying a predetermined field to deflectors 12 and 20 are not shown in FIG. 1. The manner in which such a field can be applied is well-known.

In a preferred mode of operation, deflector 12 digitally deflects beam 10 such that the center of each resolvable spot obtainable from the deflector coincides with the center of a fly's eyelens in plane 15. For purposes of this invention, plane 15 can be any plane in which deflector 12 provides resolvable spots. As shown in FIG. 1, the resolvable spots in plane 15 are contiguous to one another. For this case, the fly's eyelens is constructed such that the individual lenses comprising the composite lens are also contiguous. As shown, a filed of the proper magnitude has been applied to deflector 12 to deflect light beam 10 to a first resolvable spot occupied by lens 14a. In a similar manner, deflector 12 can selectively deflect beam 10 to the remaining first resolvable spot positions occupied by lens 14b and lens 14c. In FIG. 1, the lenses comprising the fly's eyelens are illustrated as converging lenses having a focal plane denoted by dotted line 15'. However, diverging lenses can also be utilized. In focal plane 15', the size of the 15'. at which lens 14a is positioned is reduced b the focusing action of lens 14a to a second size illustrated as dot 11a. Similarly, when beam 10 is deflected to either of the positions occupied by lenses 14b or 14c, second resolvable spot 11b or 11c, respectively, is formed. Thus the size of the resolvable spots obtained from deflector 12 is selectively reduced from a first size having substantially the same diameter as the fly eye's lenses to a second size illustrated by dots 11a, 11b and 11c. In the case where diverging lenses are utilized, the second resolvable spots are virtual.

The center-to-center distance between any two adjacent second spots remains substantially unchanged. However, the reduction in element spot size increases the separation between any two adjacent second spots. That is, a void between any two adjacent second spots is created resulting in an increase in the ratio of spot separation to spot size. As shown, lens 16 is positioned to intercept beam 10 as the beam diverges from the resolvable spot formed by lens 14a. Lens 16 is also positioned to intercept light beam 10 as it diverges from anyone of the remaining second resolvable spots in plane 15'. Lens 16 images the resolvable spots 11a, 11b and 11c and the associated separation between these spots onto plane 24. The imaged spots are shown as 11a', 11b' and 11c'. Since the ratio of spot separation to spot size in plane 15' is maintained by this imaging, the increased separation or void present in plane 15' between any two second spots is also present in plane 24. This increased separation can accommodate additional resolvable spots. The additional spots are provided by light beam deflector 20 which is positioned to intercept light beam 10 and selectively deflect the beam to at least one resolvable spot in the separation between the positions occupied by spots 11a', 11b' and 11c'. As shown, deflector 20 has deflected light beam 10 such that the beam is incident the spot 11a'' rather than 11a'. That is, a field is applied to deflector 20 so as to further deflect beam 10 to the resolvable position in plane 24 shown as resolvable spot 11a''; whereas if beam 10 had traversed deflector 20 without further deflection, the beam would have been incident the resolvable position shown as resolvable spot 11a'. In a preferred embodiment, the total number of resolvable spots obtained within the angular deflection range of the deflection system is equal to $N_{R1} \times N_{R2}$, the product of the number of spots obtainable individually from light beam deflectors 12 and 20. In this embodiment, deflector 20 has an aperture large enough to completely contain beam 10 in all of the deflected positions so as to provide the $N_{R1} \times N_{R2}$ resolvable spots.

The function of the individual lenses comprising fly's eyelens 14 can alternatively be viewed as increasing the divergence angle of beam 10 from that present without the fly's eyelens. It can be shown that the increased divergence angle decreases the diffraction angle $\theta_R$ upon focusing of beam 10 by lens 16. From the equation $N_R = \theta/\theta_R$ given previously, an increase in the number of available resolvable positions in plane 24 is achieved. Deflector 20 deflects beam 10 to the increased number of available positions.

Lens 16 pivots beam 10 onto substantially the same area of deflector 20 regardless of from which second resolvable spot in plane 15' beam 10 is diverging. This reduces the size of E-O deflector 20 necessary to contain a deflected beam. The appropriate position for lens 16 can be calculated from the following lens equation:

$$1/l_1 + 1/l_2 + 1/l_3 = 1/f$$

Where:
 $l_1$ is the distance between plane 15' and the plane within deflector 12 at which the center rays of the deflected beams emerging from deflector 12 intersect when extended back into the deflector;
 $l_2$ is the distance between plane 15' and lens 16;
 $l_3$ is the distance between lens 16 and the front face of deflector 20, and
 $f$ is the focal length of lens 16.

When lens 16 is a distance of one focal length from plane 15', the individual rays comprising the beam are substantially parallel when incident on deflector 20. When lens 16 is at a distance greater than one focal length from plane 15', the rays are converging when incident on deflector 20. In either case the beams are incident substantially the same area of deflector 20. As shown, beam 10 is converging when incident deflector 20.

The present invention will operate, although not optimally, without lens 16. To achieve operation in such a case, the incident face of deflector 20 is preferably positioned at the focal plane of fly's eyelens 14. This embodiment necessitates deflector 20 having a sufficient aperture so as to contain the unfocused beam. Also, display plane 24 must be in close proximity to deflector 20 so as to intercept the diverging deflected beams in a plane where there is at least one available beam position between any two adjacent light beam positions emerging from the reduced spots in plane 15'.

Figure 2:
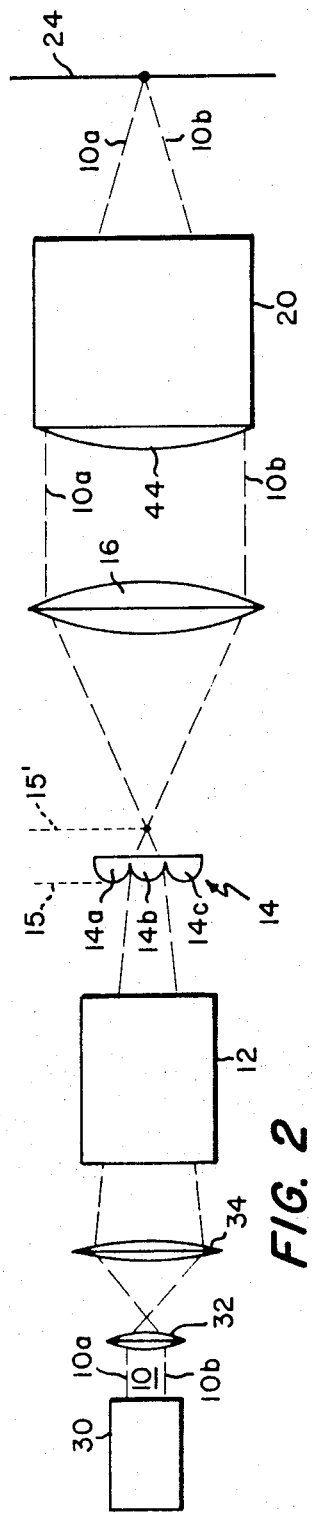
FIG. 2 is a diagrammatic illustration of a preferred embodiment of the present invention.

FIG. 2 diagrammatically illustrates a preferred embodiment of the present invention which includes passive optical elements for optimizing the performance of the present invention. Numerals corresponding to those of FIG. 1 are used to designate similar elements. Light beam 10 is shown generated by light source 30 which is preferably a laser. Lenses 32 and 34 form a telescopic system which increases the diameter of laser beam 10. The greater beam width decreases the diffraction angle $\theta_R$ thereby increasing the number of obtainable resolvable spots. As shown in FIG. 2, the light-focusing means includes lenses 16 and 44. Lens 16 is positioned at a distance of one focal length from plane 15' such that the light rays emerging from the lens are parallel. Lens 44 is positioned adjacent second deflector 20 to focus the parallel rays of beam 10 emerging from lens 16. The utilization of lenses 16 and 44 in the manner described increases the width of beam 10 within deflector 20 thereby increasing the obtainable deflection for a given volume of E-O material. With lens 44 in the deflection system, the angular range of deflection that can be contained within deflector 20 is approximately given by $W/f$, where $W$ is the aperture of deflector 20 and $f$ the focal length of lens 44. The focal length of lens 44 is chosen so that deflected beam 10 is contained within deflector 20.

The principle of operation of the embodiment illustrated in FIG. 2 is identical to that discussed in conjunction with the embodiment illustrated in FIG. 1. The lenses comprising the fly's eyelens, generally designated 14, individually reduce the size of the first resolvable spots. The first resolvable spots are reduced from a size substantially the same as the diameter of the light beam in plane 15 of the fly's eyelens to a second smaller size in focal plane 15' of the lens. Thus an increased separation between any two adjacent second spots is obtained. The reduced resolvable spots and associated separation in plane 15' are imaged by lenses 16 and 44 onto display plane 24. The increased ratio of spot separation to spot size obtained in plane 15' is preserved by the imaging. This increased separation is utilized advantageously by deflector 20 which deflects beam 10 to at least one additional resolvable spot in one of the increased separations in plane 24. The number of available resolvable positions obtained within the total deflection range provided by deflector 12 and the passive optical elements 16 and 44 can accommodate the product of the number of spots obtainable separately from deflectors 12 and 20.

Figure 3:
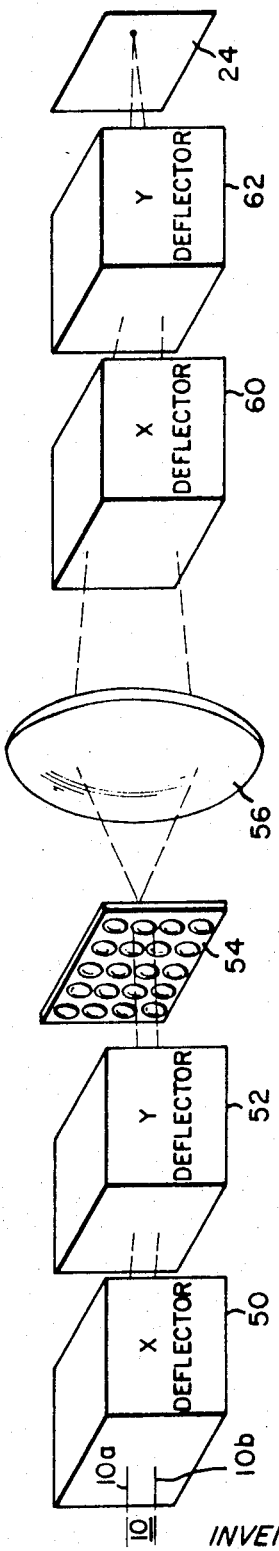
FIG. 3 is a diagrammatic illustration of a two-dimensional light-beam-deflection system.

FIG. 3 is a schematic illustration of an embodiment for achieving two-dimensional light beam deflection. Light beam deflector 50 deflects beam 10 in a first direction. Similarly, light beam deflector 52 deflects light beam 10 in a second direction. For purposes of discussion, the first and second directions will be referred to as the $X$ and $Y$ directions respectively. In the embodiment described, the $X$ and $Y$ directions are substantially perpendicular to one another. An array 54 of tiny lenses intercept light beam 10 as the beam emerges from deflector 52. The tiny lenses comprising the array individually reduce the element spot size of each of the resolvable spots obtained from deflectors 50 and 52. This provides an increased separation between any two adjacent resolvable spots in either the $X$ or $Y$ directions. This can be used advantageously by providing additional deflectors to deflect light beam 10 into the separations. In a preferred embodiment, the number of individual lenses comprising array 54 is equal to the number of resolvable spots achievable from the X and Y deflectors 50 and 52. That is, if the X deflector provides $M$ resolvable spots and the Y deflector provides $N$ resolvable spots, then the number of individual lenses in array 54 is equal to $M \times N$.

Field lens 56 focuses beam 10 such that beam 10 is incident substantially the same area of deflector 60 regardless of the direction of beam 10 when incident the lens. Lens 56 also images the reduced spots provided by the fly's eyelens 54 onto display plane 24. The increased separation between adjacent reduced spots is maintained by the imaging. Deflector 60 deflects the light beam in the $X$ direction to at least one resolvable spot within the increased separation in plane 24 between any two adjacent spots in the $X$ direction. Deflector 62 then deflects the light beam to fill the separation between adjacent resolvable spots in the $Y$ direction. The total number of resolvable spots obtained on display plane 24 is now equal to the product of the number of spots obtained individually from deflectors 50, 52, 60 and 62. In this embodiment, deflectors 50 and 52 operate preferably in a digital mode to selectively deflect light beam 10 onto the centers of an individual lens in array 54. Deflectors 60 and 62 may operate in either a digital or analog mode to fill the increased separation between the resolvable spots of reduced size.

The operation of the two-dimensional light beam deflection illustrated in FIG. 3 can be optimized by the addition of further optical lenses not illustrated in FIG. 3. A field lens positioned between deflectors 50 and 52 to focus the deflected light beam exiting deflector 50 onto the same aperture area of deflector 52 in a manner similar to field lens 56 improves the performance of the system. Similarly, a field lens positioned between deflectors 60 and 62 achieves the same result. Also, it may be desirable to place a further converging lens prior to each of the deflectors 52, 60 and 62. The function of these lenses would be equivalent to lens 44 shown in FIG. 2 and which has been previously discussed.

While this invention has been disclosed with reference to a series of preferred embodiments, it should be understood by those skilled in the art that changes in form and detail may be made without departing from the spirit and scope of the invention.

The embodiments of the invention in which exclusive property or right is claimed are defined as follows:

1. A light-beam-deflection system comprising:

first light beam deflector adapted to receive an incident light beam and to selectively deflect the light beam to one or another of a plurality of first resolvable spots;
light directing means individually positioned at each of the plurality of first resolvable spots to intercept the light beam and to direct the light beam to second resolvable spots reduced in size from the first spots thereby creating a separation between any two adjacent resolvable positions of the light beam emerging from the second resolvable spots, and
a second light beam deflector positioned to intercept a light beam emerging from any one of the second resolvable spots and to selectively deflect the beam to at least one additional resolvable position in the separation between any two adjacent positions of the light beam emerging from the second resolvable spots.

2. The light-beam-deflection system of claim 1 including light-focusing means positioned to intercept the light beam emerging from any one of the second resolvable spots and to focus the light beam onto substantially the same area of the second light beam deflector.

3. The light-beam-deflection system of claim 2 wherein the light-directing means are individual diverging lenses positioned at each of the plurality of first resolvable spots, each diverging lens having substantially the same diameter as the first resolvable spot at which the lens is positioned.

4. The light-beam-deflection system of claim 2 wherein the light-directing means are individual converging lenses positioned at each of the plurality of first resolvable spots, each converging lens having substantially the same diameter as the first resolvable spot at which the lens is positioned.

5. The light-beam-deflection system of claim 2 wherein the light focusing means includes:
a first converging lens positioned to focus the light beam emerging from any one of the second resolvable spots onto the same area of the second deflector, the individual rays comprising the light beam being substantially parallel when incident the second deflector, and
a second converging lens positioned between the first converging lens and the second deflector to focus the parallel rays such that the deflected beam passes entirely within the second deflector.

6. The light-beam-deflection system of claim 5 wherein the first light beam deflector is a digital light beam deflector.

7. The light-beam-deflection system of claim 6 wherein at least one of the first and second light beam deflectors is electro-optic.

8. A light-beam-deflection system comprising:
a first light beam deflector for selectively deflecting a light beam to one or another of $M$ resolvable spots in a first direction;
a second light beam deflector positioned to intercept the light beam emerging from the first light beam deflector and to selectively deflect the light beam to one or another of $N$ resolvable spots in a second direction;
light directing means individually positioned at each of the $M \times N$ resolvable spots to intercept the light beam and to reduce the size of the $M \times N$ resolvable spots thereby creating a separation between any two adjacent resolvable positions of the light beam emerging from the $M \times N$ resolvable spots of reduced size;
a third light beam deflector positioned to intercept the focused light beam emerging from any one of the $M \times N$ resolvable spots of reduced size and to selectively deflect the beam to at least one resolvable position between any two adjacent resolvable positions of the light beam emerging from the $M \times N$ resolvable spots of reduced size in one of the first and second directions;
light-focusing means positioned between the second and third deflectors to intercept the light beam diverging from any one of the $M \times N$ resolvable spots of reduced size and to focus each beam onto the same area of the third deflector, and a fourth light beam deflector positioned to intercept the light beam emerging from the third deflector and to selectively deflect the beam to at least one resolvable position between any two adjacent positions of the light beam emerging from the $M \times N$ resolvable spots of reduced size in the other of the first and second directions, the third and fourth light beam deflectors thereby increasing the number of resolvable spots obtained within a given area of light beam deflection.

9. The light-beam-deflection system of claim 8 wherein:

the second direction is substantially perpendicular to the first direction, and the light directing means are individual diverging lenses positioned at each of the $M \times N$ resolvable spots, each diverging lens having substantially the same diameter as the resolvable spot at which the lens is positioned.

10. The light deflection system of claim 8 wherein:

the second direction is substantially perpendicular to the first direction;

the light directing means are individual converging lenses positioned at each of the $M \times N$ resolvable spots, each converging lens having substantially the same diameter as the resolvable spot at which the lens is positioned.

11. A method of deflecting a light beam which comprises:

deflecting a light beam to one or another of a plurality of first resolvable spots;

directing the light beam emerging from any one of the first resolvable spots to second resolvable spots reduced in size from the first resolvable spots, thereby creating a separation between any two adjacent resolvable positions of the light beam emerging from the second resolvable spots, and deflecting the light beam emerging from any one of the second resolvable spots to at least one additional position in the separation between any two adjacent positions of the light beam emerging from the second resolvable spots.

* * * * *